(12) United States Patent
Villet et al.

(10) Patent No.: US 10,690,167 B2
(45) Date of Patent: Jun. 23, 2020

(54) ATTACHMENT FITTED ON A SINGLE SIDE

(71) Applicant: LISI AEROSPACE, Paris (FR)

(72) Inventors: Antoine Villet, Cergy (FR); Nicolas Naretto, Rancho Palos Verdes, CA (US); Olivier Gay, Commeny (FR); Guy Pailhories, Villefranche de Rouergue (FR)

(73) Assignee: LISI AEROSPACE, Paris (FR)

( * ) Notice: Subject to any disclaimer, the term of this patent is extended or adjusted under 35 U.S.C. 154(b) by 130 days.

(21) Appl. No.: 15/735,180

(22) PCT Filed: Jun. 10, 2016

(86) PCT No.: PCT/EP2016/063298
§ 371 (c)(1),
(2) Date: Dec. 9, 2017

(87) PCT Pub. No.: WO2016/198600
PCT Pub. Date: Dec. 15, 2016

(65) Prior Publication Data
US 2018/0238372 A1  Aug. 23, 2018

(30) Foreign Application Priority Data
Jun. 11, 2015 (FR) ...................................... 15 55313

(51) Int. Cl.
*F16B 19/10* (2006.01)
(52) U.S. Cl.
CPC .......... *F16B 19/1072* (2013.01); *F16B 19/10* (2013.01)
(58) Field of Classification Search
CPC .... F16B 13/061; F16B 13/122; F16B 13/124; F16B 13/128; F16B 19/10; F16B 19/1072;
(Continued)

(56) References Cited
U.S. PATENT DOCUMENTS 3,030,705 A * 4/1962 Gill ..................... B25B 27/0007
29/512
3,236,143 A   2/1966 Wing
(Continued)

FOREIGN PATENT DOCUMENTS
GB        2368889        5/2002

OTHER PUBLICATIONS

Rochus, Johann, International Search Report, dated Aug. 17, 2016, 2 pages, European Patent Office, Rijswijk, Netherlands.
(Continued)

*Primary Examiner* — Roberta S Delisle
(74) *Attorney, Agent, or Firm* — Henricks Slavin LLP

(57) ABSTRACT

The invention concerns a fastener used to attach structural components that have aligned perforations with a nominal diameter (D), where the fastener comprises a minimum grip plane (Gmin) and a maximum grip plane (Gmax), and
  A screw ($^{12}$) comprising an enlarged head and a threaded portion (22);
  A sleeve (30) comprising an enlarged head, a cylindrical tubular body and a tapped portion (36) that engages the threaded portion (22) of the screw, where the tapped portion (36) is adjacent to an internally smooth portion of the body (34) of the sleeve. This smooth portion has a thickness (E), a non-deformable area (A) adjacent to the head of the sleeve and a deformable area (B) adjacent the non-deformable area (A). The sleeve's deformable area (B) can be deformed into a bulb (48) intended to come into contact with a blind side (46) of the structural components.
The deformable area (B) extends over a length (L) greater than a minimum length (Lmin) and less than a maximum length (Lmax), such as:

$L\mathrm{min}=D/2+2E+(G\mathrm{max}-G\mathrm{min});$ $L\mathrm{max}=(E/0.092)$ (Continued)

In particular, the invention applies to the assembly of aircraft structures.

15 Claims, 4 Drawing Sheets

(58) Field of Classification Search
CPC ... F16B 19/1081; F16B 19/109; F16B 37/067
USPC .......................... 411/34, 44, 45, 55, 70, 80.6
See application file for complete search history.

(56) References Cited

U.S. PATENT DOCUMENTS

| | | | |
|---|---|---|---|
| 3,304,830 A * | 2/1967 | Shackelford | B25B 27/0007 29/524.1 |
| 3,322,449 A * | 5/1967 | Becker | F16B 19/1072 29/509 |
| 3,345,900 A * | 10/1967 | Villo | F16B 19/1063 411/41 |
| 6,868,757 B2 | 3/2005 | Hufnagl et al. | |
| 8,434,984 B2 * | 5/2013 | Toosky | F16B 19/10 411/360 |
| 10,006,478 B2 * | 6/2018 | Hufnagl | F16B 5/0258 |
| 2005/0271491 A1 * | 12/2005 | Opper | B21J 15/025 411/30 |
| 2006/0251489 A1 * | 11/2006 | Denham | F16B 29/00 411/34 |
| 2013/0205573 A1 * | 8/2013 | Kashimura | F16B 37/067 29/523 |
| 2014/0130335 A1 | 5/2014 | Bickford et al. | |

OTHER PUBLICATIONS

Rochus, Johann, Written Opinion, dated Dec. 15, 2016, 6 pages, European Patent Office, Munich, Germany.

* cited by examiner

//  ATTACHMENT FITTED ON A SINGLE SIDE

CROSS REFERENCE TO RELATED APPLICATIONS

This application is a National Stage of International Application No. PCT/EP2016/063298, filed Jun. 10, 2016, the entire contents of which are incorporated herein by reference.

This invention concerns a fastener that is installed through structures on one side of the assembly only, commonly referred to as the "accessible" side. This type of fastener is used, for example, in the assembly of aircraft structures.

In particular, this invention concerns a fastener used to attach structural components that have aligned perforations with a nominal diameter (D) and that have a nominal thickness that varies between a minimum thickness and a maximum thickness, with the fastener comprising a minimum grip plane (Gmin) and a maximum grip plane (Gmax), and A screw comprising an enlarged head at one end and a threaded portion at an opposite end;

A sleeve comprising an enlarged head capable of accommodating the head of the screw and designed to come into contact with the first side of the structural components, a tubular body and a tapped portion that engages the threaded portion of the screw, where the tapped portion is adjacent to an internally smooth portion of the body of the sleeve. This smooth portion has a nominal thickness (E), a non-deformable area adjacent to the head of the sleeve and a deformable area adjacent to the non-deformable area;

The resistance of the deformable area of the sleeve is reduced compared with the resistance of the non-deformable area, in order to facilitate the radial deformation of the deformable portion into a bulb intended to come into contact with one side of the structural components opposite the first side, commonly called the "blind" side.

Also known as a "blind rivet", this type of fastener is described, for example, in the U.S. Pat. No. 3,236,143 document, and the fastener also includes a frangible gripping device in a shear groove.

Aircraft structures increasingly include composite materials that present a risk of delamination when they are locally subjected to significant compressive stress. In order to avoid delaminating the composite, the external diameter of the bulb of a blind fastener should not be too small compared with the nominal diameter (D) of the perforation into which the fastener is inserted. Moreover, this type of fastener's bulb should have a uniform span and must be formed repetitively, both at the minimum structural thickness and the maximum structural thickness. When it is not possible to inspect the blind side of the structure, it is mandatory to ensure that a bulb is properly formed and sufficiently large.

The purpose of the invention is to eliminate the disadvantages of earlier fasteners, and in particular to provide a fastener that enables the formation of a bulb with an external diameter equal to one and a half times the nominal diameter of the perforation of the structure and whose form is uniform and repeatable, therefore stable, regardless of the structural thickness to be tightened, with the given nominal thickness varying between a minimum thickness and a maximum thickness.

For this, the fastener according to the invention is of the aforementioned type, such that the deformable area extends over a length that is greater than a minimum length (Lmin) and less than a maximum length (Lmax), where the minimum and maximum lengths are defined by the following relationships:

$$Lmin = D/2 + 2E + (Gmax - Gmin), \qquad \{1\}$$

$$Lmax = (E/0.092) \qquad \{2\}$$

where the beginning of the deformable area is at most placed in the fastener's minimum grip plane (Gmin).

This type of fastener offers the advantage of forming wide, stable bulbs.

Ideally, the fastener according to the invention also has at least one of the following characteristics:

The reduction in the resistance of the deformable area is achieved through a local reduction in hardness;

The reduction in the resistance of the deformable area is achieved through a reduction in the nominal thickness of the tubular body;

The sleeve is made of A286-type stainless steel or a Beta-C type titanium alloy;

The deformable area has a hardness less than or equal to 300 HV;

The deformable area has a hardness less than or equal to 220 HV;

The fastener has a diameter of 6.32 mm, a tubular body nominal thickness of 0.75 mm and a deformable area whose length is between 6.67 mm and 8.152 mm;

The fastener has a diameter of 4.80 mm, a tubular body nominal thickness of 0.58 mm and a deformable area whose length is between 5.55 mm and 6.304 mm;

The sleeve includes titanium or a titanium alloy.

Other purposes, characteristics and advantages of the invention will appear in the description of examples of embodiments of the invention, with descriptions made in connection with drawings in which.

In order to make the drawings easier to understand, only those elements required to understand the invention are shown. The same references are used for the same elements in all drawings. The dimensions given in the rest of the description are considered nominal. A tolerance, of 0.1 mm for example, can be applied to all or some of these dimensions, in accordance with standard mechanical design practices.

Figure 1:
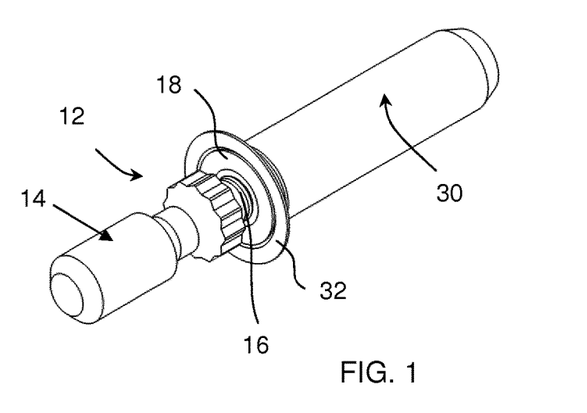
FIG. 1 is an isometric view of a fastener according to one embodiment of the invention, in an uninstalled state.
Figure 2:
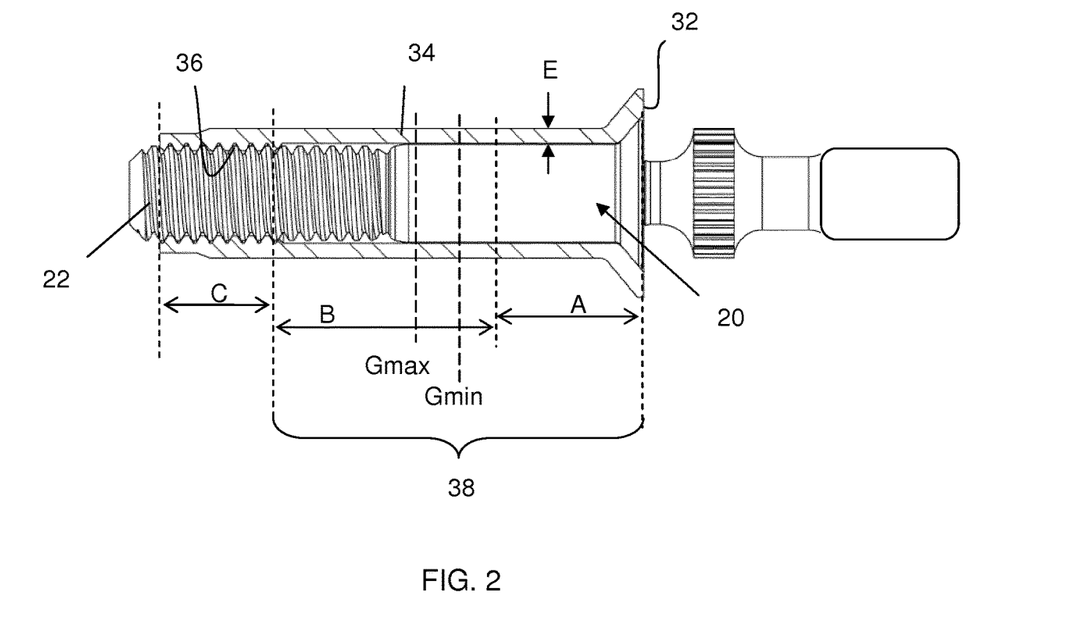
FIG. 2 is a cross-sectional view of a fastener according to one embodiment of the invention, in an uninstalled state.
Figure 3:
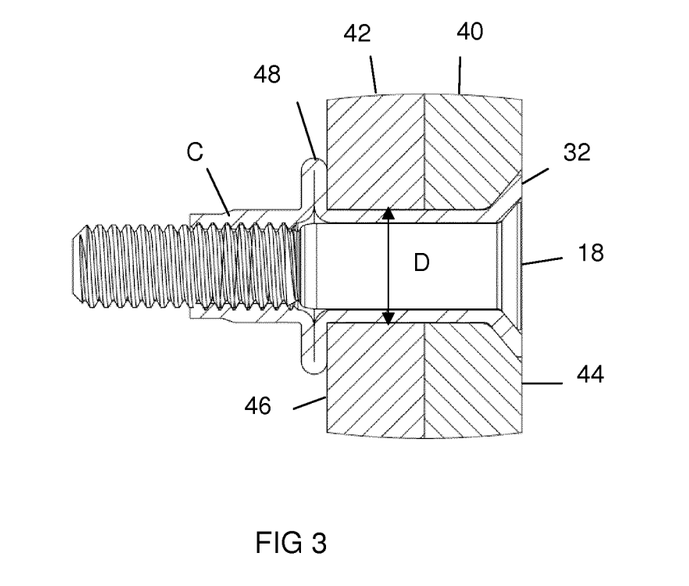
FIG. 3 is a cross-sectional view of a fastener according to one embodiment of the invention, in an installed state and forming a bulb.

With reference to FIGS. 1 to 3, a fastener (10) according to one embodiment of the invention comprises a screw (12) and a sleeve (30). The screw (12) comprises a gripping device (14), a shear groove (16), a countersunk head (18), a cylindrical shaft (20) and a threaded portion (22).

The shear groove (16) is sized in such a way as to have the smallest screw (12) diameter capable of supporting a given installation tensile stress and that breaks under a given torsional stress.

The screw (12) is inserted with slight clearance into the sleeve (30), which comprises an enlarged flange (32) capable of accommodating the countersunk head (18) of the screw and a tubular shaft (34). Before installation of the fastener (10) in a structure, the external surface of the tubular portion (34) is cylindrical.

At one end opposite the flange, the tubular shaft (34) has a tapped portion (36), and between the flange and the tapped portion, a portion whose internal surface (38) is cylindrical and smooth, in other words, not tapped. In the example shown in FIG. 2, the nominal wall thickness (E) of the tubular shaft is constant. The threading of the screw (12) and the tapping of the sleeve (30) are complementary. For example, these threads comply with standard AS8879, commonly used for aeronautical fasteners.

The length of the fastener (10) depends on the structural thickness to be assembled, whose nominal thickness varies between a minimum thickness and a maximum thickness. The nominal structural thickness interval conventionally varies in steps of 1/16" (1.5875 mm). The fastener (10) therefore has a minimum grip capacity and a maximum grip capacity that enable the assembly of a nominal structural thickness that varies between a minimum and a maximum. The plane corresponding to the minimum thickness that the fastener can tighten is called "min grip" or "minimum tightening plane" and is referred to as "Gmin" in the figures. The plane corresponding to the maximum thickness that the fastener can tighten is called "max grip" or "maximum tightening plane" and is referred to as "Gmax" in the figures. On the fastener, the Gmax and Gmin distances are measured from the end of the flange (32) when the head is countersunk (FIG. 2), and from underneath the flange when the head is a protruding head.

The total length of the sleeve (30) is divided into three successive and adjacent areas. An initial area A (FIG. 2) comprises the flange (32) and an adjacent tubular shaft portion (34) with a smooth internal surface. Area A is non-deformable. It extends over a length at most equal to the minimum structural thickness (Gmin) that the fastener can assemble.

A second area B, referred to as the deformable area, extends over the remainder of the tubular shaft (34) that has a smooth internal surface. Area B of the sleeve is intended to be deformed to form a bulb, which will bear on the blind side of the structures to be assembled. In order to facilitate the formation of the bulb, area B must have reduced resistance compared with the resistance of the non-deformable area. This reduction can be achieved by reducing the hardness on deformable area B. In this case, the hardness of deformable area B must be at least 20% lower than the hardness of non-deformable area A, so that deformation ideally takes place in deformable area B, with this difference depending on the material actually used. The reduction in hardness can be achieved through local annular annealing, for example by means of an induction machine.

The sleeve may also be formed of various materials of different hardnesses, welded together: deformable area B may be made of a material that is more deformable than that of non-deformable area A.

The reduction in resistance can also be achieved through the local reduction of the nominal thickness of the sleeve, for example by means of a shoulder on a portion of the smooth internal surface of the sleeve, decreasing the thickness of the sleeve along the length of this area.

When the fastener (10) is not installed, area B of the sleeve covers the remaining portion of the smooth shaft (22) of the screw and a threading portion (24).

The third sleeve area C extends over the entire tapped portion (36). This area acts as a nut. When the fastener (10) is not installed, this area C is in contact with a terminal threading portion (22) of the screw (12).

FIG. 3 shows the fastener (10) from FIGS. 1 and 2 installed in two structures (40, 42) to be assembled. The gripping device (14) has been broken in the shear groove (16), so that only the head (18) of the screw and the flange (32) of the sleeve remain, together forming the head of the fastener, embedded in a countersink produced earlier in an accessible side (44) of the structure (40). The first area A of the sleeve (30) is entirely embedded in the structures (40, 42). The second area B of the sleeve is deformed and comprises a bulb (48), one side of which is in contact with the blind side (46) of the structure (42), opposite the accessible side (44). The tensile stress between the head of the fastener (20, 32) and the bulb (48) makes it possible to hold the assembled structures (40, 42) in place. In the installed position, the third sleeve area C covers a threading portion (24) of the screw adjacent to the shaft (22). Advantageously, the fastener has the advantage of including a mechanical or chemical locking component, in order to ensure that the engaged threads do not come loose, for example by deforming the tapped threads of the sleeve, or by adding a locking product to the threads of the screw.

The fastener (10) according to the invention has an external diameter that can be inserted with clearance into the perforation of a structure with a nominal diameter D. Once the fastener (10) has been deformed, the bulb (48) has an external diameter that is at least equal to one and a half times the nominal diameter D of the perforation over the entire tightening range. A correctly formed bulb is shown in FIG. 3. When the bulb is incorrectly formed, the risk of matting and/or the risk of delamination increases. The bulb can thus take the form of an "umbrella" (FIGS. 4A, 4B) in which the bulb forms an angle α with the blind side (46). The bearing surface is significantly reduced, which leads to an increased risk of matting. Another incorrect form is the formation of a double bulb (FIG. 4C), which produces a bearing surface of an insufficient diameter on the blind side (46).

For example, the fastener (10) is installed using an installation tool that initially pulls the gripping device (14) of the screw, while holding the sleeve (30) in the structure by pressing the flange (32) against the structure (40).

The traction drives the threaded portion (22) of the screw and the tapping (36) of the sleeve towards the blind side (46) of the structure. The tubular shaft's deformation area B is deformed to create a bulb (48), one side of which comes to bear against the blind side (46).

During a second stage, a rotation movement is imparted to the screw, so that it is screwed into the sleeve (14) until the head (20) of the screw bears on the flange (32) of the sleeve.

The last stage consists in finalizing the installation of the fastener (10), by breaking the screw's gripping device (14). For this, the installation tool continues to rotate in the same rotation direction, applying increasing stress to the structure and the screw. The shear groove (16) is designed to break beyond a certain torque generating a minimum level of stress in the structure. The groove (16) therefore breaks once the torque threshold has been reached, leaving the head (20) of the screw flush with the accessible surface of the structure (40).

For example, the screw is made of Ti6Al4V titanium alloy, coated with a layer of lubricant, and the sleeve is, for example, made of stainless steel such as A286 passivated stainless steel. Deformation area B is produced through local annealing. The resistance of this area is around 550 MPa, while the resistance of the first and third areas A and C is around 1,200 MPa. Other materials can be chosen for the screw and sleeves.

In order to form a correctly shaped bulb that reaches a diameter equal to one and a half times the diameter of the perforation, the applicant has established that the length (L) of deformable area B should be between a minimum value and a maximum value defined by two relationships.

The applicant has thus established that in order to form a bulb equal to one and a half times the diameter of the perforation for a given nominal structural thickness, in the minimum to maximum thickness configurations, the length (L) of deformable area B must be greater than a minimum length (Lmin) according to the {1} relationship below:

$$Lmin=D/2+2E+(Gmax-Gmin), \quad \{1\}$$

The applicant has also established that the shape of the bulb is correct and reproducible if the length (L) of deformable area B is less than a maximum length (Lmax) according to the {2} relationship below:

$$Lmax=(E/0.092) \quad \{2\}$$

In the {1} and {2} relationships, D is the nominal diameter of the perforation in which the fastener (10) is intended to be inserted, E is the nominal thickness of the wall of deformable area B of the tubular shaft (34) of the sleeve (30) before deformation.

Figure 4A:
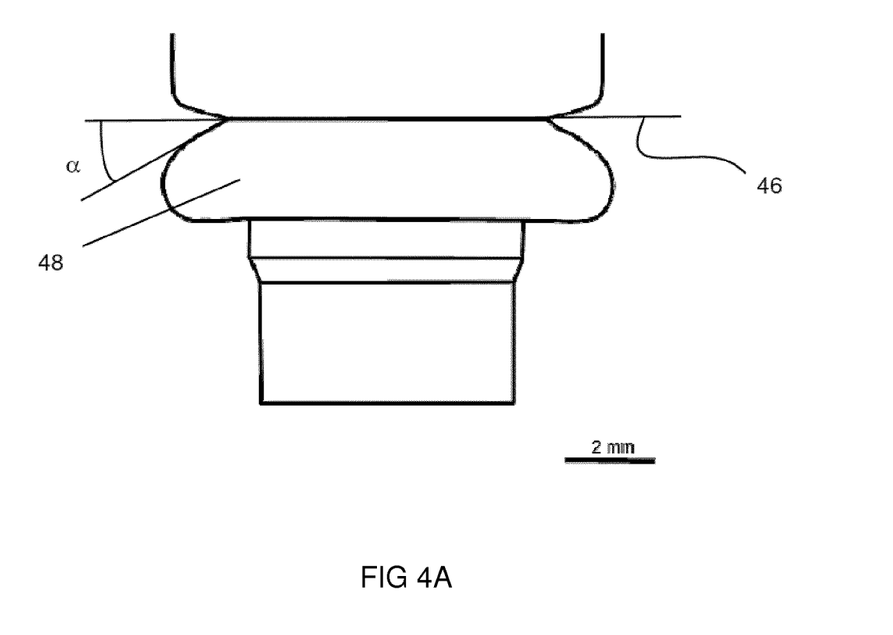
FIGS. 4A, 4B, and 4C are views of incorrectly formed bulbs.

The value of 0.092 was established through testing. Below this value, there is a proven risk of instability of the deformable area, which can lead to the formation of "umbrella" bulbs or double bulbs, as shown in FIGS. 4A and 4B.

Figure 4B:
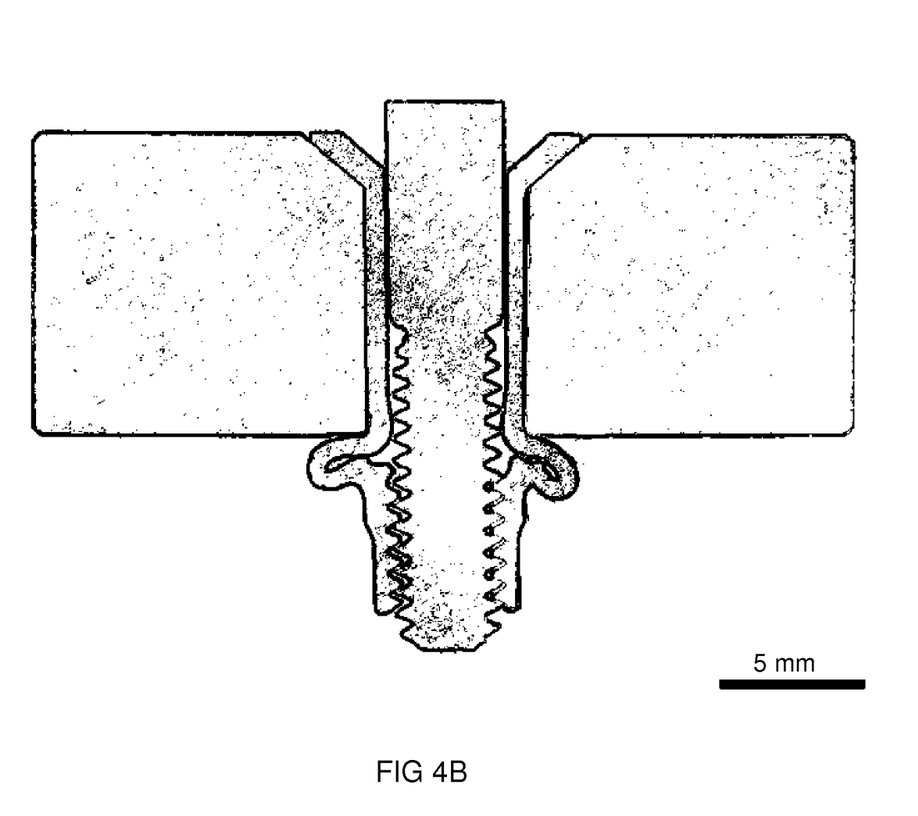
Figure 4C:
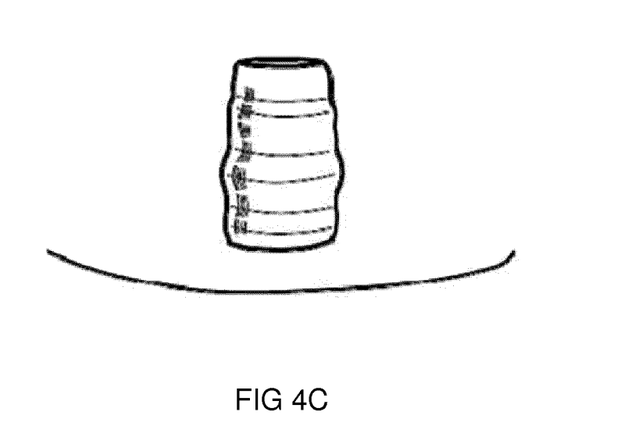

For example, a sleeve with a thickness of 0.625 mm and a length (L) of deformable area B equal to 7.286 mm for a nominal diameter of 6.35 mm deforms in the shape of an umbrella, as can be seen in FIG. 4B. According to relationships {1} and {2}, the length (L) of the deformable area must be between Lmin=6.408 mm and Lmax=6.789 mm. A length of 7.286 mm greater than the maximum length defined by the {2} relationship does not therefore enable the formation of a proper bulb, whose entire surface bears on the rear side of the structure.

In another example, a blind fastener marketed under the ERGOTECH trademark, described in the U.S. Pat. No. 6,868,757 and comprising the characteristics of the preamble of claim 1, with a thickness of 0.51 mm for a nominal diameter of 6.35 mm and a length (L) of deformable area B equal to 4.11 mm, is deformed into a proper bulb but with a diameter equal to 1.30 times the nominal diameter of the perforation. The annealing length (L) is less than the minimum length required, which, according to the {1} relationship, is equal to 6.045 mm.

The deformable area B must begin at most in the fastener's minimum grip plane (Gmin), in order to ensure that the bulb forms on a structure that has a minimum thickness. Otherwise, the bulb will form at a distance from the blind side of the structure and will not perform its structural component tightening function.

Beyond the fastener's maximum grip plane (Gmax), the wall of the sleeve must be sufficiently deformable over at least the distance (D/2+2E), in order to form a bulb that is at least one and a half times the diameter of the perforation.

When the length (L) of deformable area B does not comply with the {2} relationship, the bulb no longer forms correctly. For example, it takes the form of an umbrella, or forms a double bulb.

For example, a fastener with a diameter of 6.32 mm designed to be inserted into a perforation with a nominal diameter D=6.35 mm (⁸⁄₃₂") and of "grip 8" type, that is to say designed to assemble structural components with a nominal thickness of 12.70 mm (⁸⁄₁₆"), has a minimum grip capacity (Gmin) of 10.914 mm and a maximum grip capacity (Gmax) of 12.898 mm. It therefore has a tightening range 1.984 mm (¹⁄₁₆"+¹⁄₆₄") greater than the grip difference of ¹⁄₁₆", in order to ensure the overlap between two consecutive structural thickness ranges. The nominal thickness (E) of the sleeve is selected to be equal to 0.75 mm, in particular to ensure a compromise between the force required to deform the sleeve and a screw diameter that is sufficient to maintain the tensile stress resulting from the installation of the fastener in the structure. The length (L) of deformable area B must therefore be Greater than: Lmin=(6.35/2)+2×0.75+1.984=6.67 mm And less than: Lmax=(0.75/0.092)=8.152 mm In the case of a fastener (10) whose deformation area B has undergone local annealing, the hardness must be sufficiently low from the minimum grip plane (Gmin) over the length L, where L is chosen to be between 6.67 mm and 8.152 mm.

It should be noted that two fasteners (10) with the same external diameter and the same sleeve thickness (E) but of different lengths, used to assemble structures of different thicknesses, may both have the same length (L) of deformable area B, since the dimensions used to establish the minimum and maximum limits of this length depend only on the perforation diameter (D) and on the sleeve thickness (E). The difference between these two fasteners lies in the starting point of deformable area B, which will be at most in the fastener's minimum tightening plane (Gmin), whose positioning depends on the length of the fastener.

For example, for the previously described fastener (10) that has a diameter of 8, table 1 indicates the positioning of the minimum tightening plane (Gmin) and the Lmin and Lmax lengths of deformable area B, for several examples of nominal thicknesses to be tightened:

TABLE 1

| Nominal thickness to be tightened (mm) [¹⁄₁₆"] | grip plane Gmin (mm) | Lengths Lmin-Lmax (mm) |
| --- | --- | --- |
| 6.35 [4] | 4.564 | 6.67-8.152 |
| 7.93 [5] | 6.152 | 6.67-8.152 |
| 9.52 [6] | 7.739 | 6.67-8.152 |
| 12.70 [8] | 10.914 | 6.67-8.152 |

It is therefore possible for several fasteners of diameter 8 and of different lengths to have an identical length (L) of deformable area B.

Figure 5:
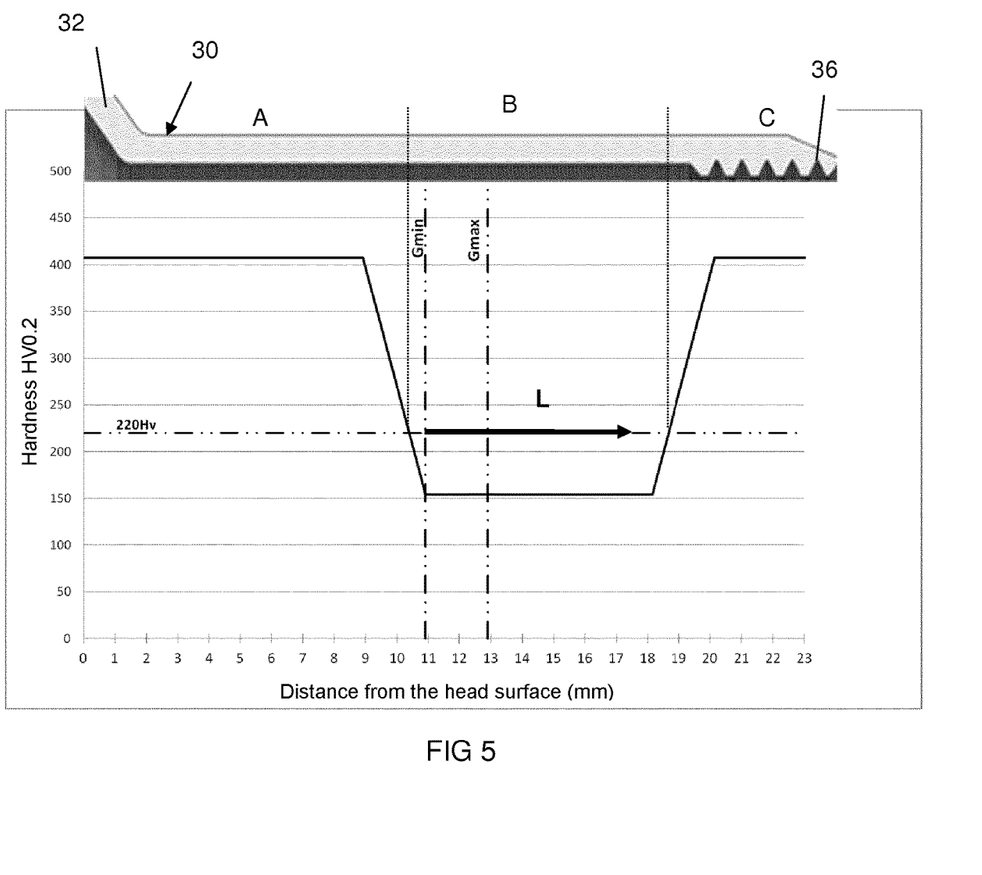
FIG. 5 is a graphical representation of the hardness gradient according to the length of the fastener's sleeve according to one embodiment of the invention.

An example of a hardness gradient of a sleeve made of A286 is shown in FIG. 5, with a length (L) of deformable area B selected at 6.68 mm from the minimum tightening plane (Gmin) of the fastener (10).

The hardness graph in FIG. 5 comprises a "low" plateau in deformable area B at around 155 HV and two "high" plateaus at around 405 HV in non-deformable areas A and C. The length of the low plateau can be less than or equal to length L. The level of hardness must be sufficiently low over length L for area B to be effectively deformed. The applicant has established that the deformable area B of an A286 stainless steel sleeve should have a hardness 45% lower than the hardness of non-deformable area A. Deformable area B is produced, for example, through local annealing, reducing the hardness of the A286 steel to around 220 HV. Local annealing results in transitional areas between the high plateau of non-deformable area A and the low plateau of deformable area B, and between the low plateau and the high plateau of area C. These slopes can be offset or can have a different slope, provided that deformable area B has a length L between the minimum and maximum values defined by the {1} and {2} relationships.

The advantage of the A286 material is that local annealing enables a significant reduction in the hardness of the material on the annealed area. During the deformation of deformable area B, the material is subjected to strain hardening and its hardness increases again. Consequently, the bulb formed has sufficient resistance to oppose the shearing stress exerted on the bearing side of the bulb against the blind side of the structure, when the structural components are subjected to stress that tends to move them apart.

The starting points and slopes of the hardness values shown in FIG. 5 are also established by taking into account the tolerances due to the annealing process, which may be in the order of mm.

Other materials can be used to form the sleeve. For example, these may be one or more titanium grades, one or more titanium alloys or a combination of titanium and titanium alloys welded to form the sleeve. The advantage of titanium and titanium alloys lies essentially in their low density and high resistance to galvanic corrosion, which makes it possible to install them in various materials.

For example, the applicant carried out deformation tests on a sleeve made of a Beta-C titanium, in other words, from the beta metastable family. This alloy shows no phase transformation in the temperature range immediately higher than solution treatment. It is for this reason that this alloy was chosen. It was assumed that the possibility of using a high or very high temperature for local annealing could sufficiently soften the material and enable the deformation of the sleeve's deformable area. Thus, the applicant found that an annealing temperature ranging from 850° C. to 1,150° C. enabled a deformable area with a lower hardness than that of the area that had not been annealed to be obtained. On the non-annealed areas, the average hardness value is 470 HV, while on the annealed deformable area, the hardness value is around 300 HV, in other words, 130 to 150 HV more than on an A286 sleeve. A Beta-C titanium alloy sleeve with a deformable area whose hardness is less than or equal to 300 HV and whose length is selected in the range defined by the {1} and {2} relationships forms a wide bulb when the fastener is inserted into a structure that has a minimum thickness that corresponds to the fastener's minimum tightening capacity.

In another example of embodiment, a fastener with a diameter of 4.80 mm designed to be inserted into a perforation with a nominal diameter D=4.83 mm (6/32") to assemble a "grip 8" structure, that is to say, a structure with a nominal thickness of 12.70 mm (8/16"), has a minimum grip capacity (Gmin) of 10.914 mm and a maximum grip capacity (Gmax) of 12.898 mm. It therefore has a tightening range of 1.984 mm (1/16"+1/64"). The nominal thickness (E) of the sleeve of a fastener of diameter 6 is 0.58 mm. The length (L) of the deformable area B must therefore be Greater than: Lmin=(4.83/2)+2×0.58+1.984=5.55 mm
And less than: Lmax=(0.58/0.092)=6.304 mm In the case of the fastener (10), the hardness of deformation area B must be sufficiently low over a length L extending from the minimum tightening plane (Gmin), where L is chosen between 5.55 mm and 6.304 mm.

The fastener according to the invention is not structurally limited to the examples described above. For example, the head of the fastener may be a protruding head instead of a countersunk head. The gripping device may have various forms, or may be omitted. In this case, the fastener is installed, for example, by screwing only the screw into the sleeve, while keeping the sleeve stationary. The screw may not include a cylindrical shaft, and may include only a threaded shaft from the lower part of the head.

The sleeve (14) may include two welded sleeve components made of different materials, and compression grooves on the external surface of the first component. Alternatively, the sleeve (14) may comprise a single sleeve component and an annular groove on its external surface.

Similarly, the screw and sleeve materials may be different from those described, and the thicknesses and hardness values of the various areas of the sleeve should be adapted according to the materials used for the sleeve and the screw.

As indicated above, the resistance of deformable area B can be reduced by reducing the thickness of deformable area B over length L, where length L must be between the minimum and maximum values defined in the {1} and {2} relationships, and where the thickness (E) of the wall is the thickness of deformable area B.

The invention claimed is:

1. Fastener to attach structural components that have aligned perforations with a nominal diameter (D), and that have a nominal thickness that varies between a minimum thickness and a maximum thickness, with the fastener comprising a minimum grip plane (Gmin) and a maximum grip plane (Gmax), and
   a screw comprising an enlarged head at one end and a threaded portion at an opposite end;
   a sleeve comprising an enlarged head capable of accommodating the head of the screw and intended to come into contact with the first side of the structural components, a cylindrical tubular body capable of accommodating the cylindrical shaft of the screw with clearance and a tapped portion that engages the threaded portion of the screw, where the tapped portion is adjacent to an internally smooth portion of the body of the sleeve said smooth portion having a nominal thickness (E), a non-deformable area (A) adjacent to the head of the sleeve and a deformable area (B) adjacent to the non-deformable area (A);
   the deformable area (B) of the sleeve has reduced resistance compared to that of the non-deformable area (A), in order to facilitate the radial deformation of the deformable portion into a bulb designed to come into contact with one side of the structural components opposite the first side;
   characterized in that the deformable area (B) extends across a length (L) that is greater than a minimum length (Lmin) and less than a maximum length (Lmax), where the minimum and maximum lengths (Lmin, Lmax) are defined by the following relationships:

$$L\mathrm{min}=D/2+2E+(G\mathrm{max}-G\mathrm{min}), \quad \{1\}$$

$$L\mathrm{max}=(E/0.092) \quad \{2\}$$

where the start of the deformable area (B) is at most placed in the minimum grip plane (Gmin) of the fastener.

2. Fastener according to claim 1, in which the reduction in the resistance of the deformable area (B) is achieved through a local reduction in hardness.

3. Fastener according to claim 2, in which the deformable area (B) has a hardness lower than or equal to 300 HV.

4. Fastener according to claim 2, in which the deformable area has a hardness lower than or equal to 220 HV.

5. Fastener according to claim 4, with a diameter of 6.32 mm, a tubular body nominal thickness (E) of 0.75 mm and a deformable area (B) whose length (L) is between 6.67 mm and 8.152 mm.

6. Fastener according to claim 4, with a diameter of 4.80 mm, a tubular body nominal thickness (E) of 0.58 mm and a deformable area (B) whose length (L) is between 5.55 mm and 6.304 mm.

7. Fastener according to claim 2, in which the sleeve is made of A286-type stainless steel or a titanium alloy.

8. Fastener according to claim 1, in which the reduction in the resistance of the deformable area (B) is achieved through a local reduction in the nominal thickness (E) of the tubular body.

9. Fastener according to claim 8, in which the sleeve is made of A286-type stainless steel or a titanium alloy.

10. Fastener according to claim 1, in which the deformable area (B) has a hardness lower than or equal to 300 HV.

11. Fastener according to claim 10, in which the sleeve is made of A286-type stainless steel or a titanium alloy.

12. Fastener according to claim 1, in which the deformable area has a hardness lower than or equal to 220 HV.

13. Fastener according to claim 12, with a diameter of 6.32 mm, a tubular body nominal thickness (E) of 0.75 mm and a deformable area (B) whose length (L) is between 6.67 mm and 8.152 mm.

14. Fastener according to claim 12, with a diameter of 4.80 mm, a tubular body nominal thickness (E) of 0.58 mm and a deformable area (B) whose length (L) is between 5.55 mm and 6.304 mm.

15. Fastener according to claim 1, in which the sleeve is made of A286-type stainless steel or a titanium alloy.

* * * * *